(12) United States Patent
Hefty et al.

(10) Patent No.: US 12,117,956 B2
(45) Date of Patent: Oct. 15, 2024

(54) WRITES TO MULTIPLE MEMORY DESTINATIONS

(71) Applicant: Intel Corporation, Santa Clara, CA (US)

(72) Inventors: Mark Sean Hefty, Aloha, OR (US); Arlin R. Davis, Yamhill, OR (US)

(73) Assignee: Intel Corporation, Santa Clara, CA (US)

( * ) Notice: Subject to any disclaimer, the term of this patent is extended or adjusted under 35 U.S.C. 154(b) by 307 days.

(21) Appl. No.: 16/726,676

(22) Filed: Dec. 24, 2019

(65) Prior Publication Data

US 2020/0133909 A1 Apr. 30, 2020

Related U.S. Application Data

(60) Provisional application No. 62/813,534, filed on Mar. 4, 2019.

(51) Int. Cl.
| | |
|---|---|
| G06F 13/42 | (2006.01) |
| G06F 9/30 | (2018.01) |
| G06F 9/54 | (2006.01) |
| G06F 13/28 | (2006.01) |
| H04L 45/00 | (2022.01) |
| H04L 69/22 | (2022.01) |

(52) U.S. Cl.
CPC ...... *G06F 13/4234* (2013.01); *G06F 9/30145* (2013.01); *G06F 9/546* (2013.01); *G06F 13/28* (2013.01); *H04L 45/566* (2013.01); *H04L 69/22* (2013.01)

(58) Field of Classification Search
CPC ..... H04L 45/566; H04L 69/22; H04L 49/201; H04L 49/358; H04L 45/16; G06F 13/28; G06F 13/4234; G06F 9/546; G06F 9/30145; G06F 9/22
See application file for complete search history.

(56) References Cited

U.S. PATENT DOCUMENTS

| | | | |
|---|---|---|---|
| 9,319,362 B1 * | 4/2016 | McAllister | H04L 12/54 |
| 10,601,713 B1 * | 3/2020 | Turgeman | H04L 47/62 |
| 2014/0177629 A1 * | 6/2014 | Manula | H04L 49/201 |
| | | | 370/390 |
| 2018/0159803 A1 * | 6/2018 | Cornett | H04L 49/90 |
| 2019/0034103 A1 * | 1/2019 | Voigt | G06F 3/064 |

OTHER PUBLICATIONS

Extended European Search Report for Patent Application No. 20156095.0, Mailed Mar. 23, 2020, 8 pages.
(Continued)

*Primary Examiner* — Ernest Unelus
(74) *Attorney, Agent, or Firm* — Compass IP Law PC

(57) ABSTRACT

Examples described herein relate to configuring a target network interface to recognize packets that are to be written directly from the network interface to multiple memory destinations. A packet can include an identifier that a portion of the packet is to be written to multiple memory devices at specific addresses. The packet is validated to determine if the target network interface is permitted to directly copy the portion of the packet to memory of the target. The target network interface can perform a direct copy to multiple memory locations of a portion of the packet.

23 Claims, 10 Drawing Sheets

(56) References Cited

OTHER PUBLICATIONS

J. Behrens, S. Jha, K. Birman and E. Tremel, "RDMC: A Reliable RDMA Multicast for Large Objects," 2018 48th Annual IEEE/IFIP International Conference on Dependable Systems and Networks (DSN), 2018, pp. 71-82, 12 pages.

European First Office Action for Patent Application No. 20156095.0, Mailed Feb. 2, 2022, 5 pages. (EP Exam Report Article 94(3) EPC).

Guo, Chuanxiong et al., "RDMA over Commodity Ethernet at Scale", SIGCOMM '16, Aug. 22-26, 2016, Florianopolis, Brazil, 14 Pages.

* cited by examiner

WRITES TO MULTIPLE MEMORY DESTINATIONS

RELATED APPLICATION

The present application claims the benefit of a priority date of U.S. provisional patent application Ser. No. 62/813,534, filed Mar. 4, 2019, the entire disclosure of which is incorporated herein by reference.

DESCRIPTION

Machine learning, artificial intelligence, and high-performance computing applications often make use of clustered systems paired with compute accelerators, such as graphics processing units (GPUs). In such environments, a copy of the input data must be made available to all accelerators in addition to the host processor(s).

DETAILED DESCRIPTION

Figure 1:
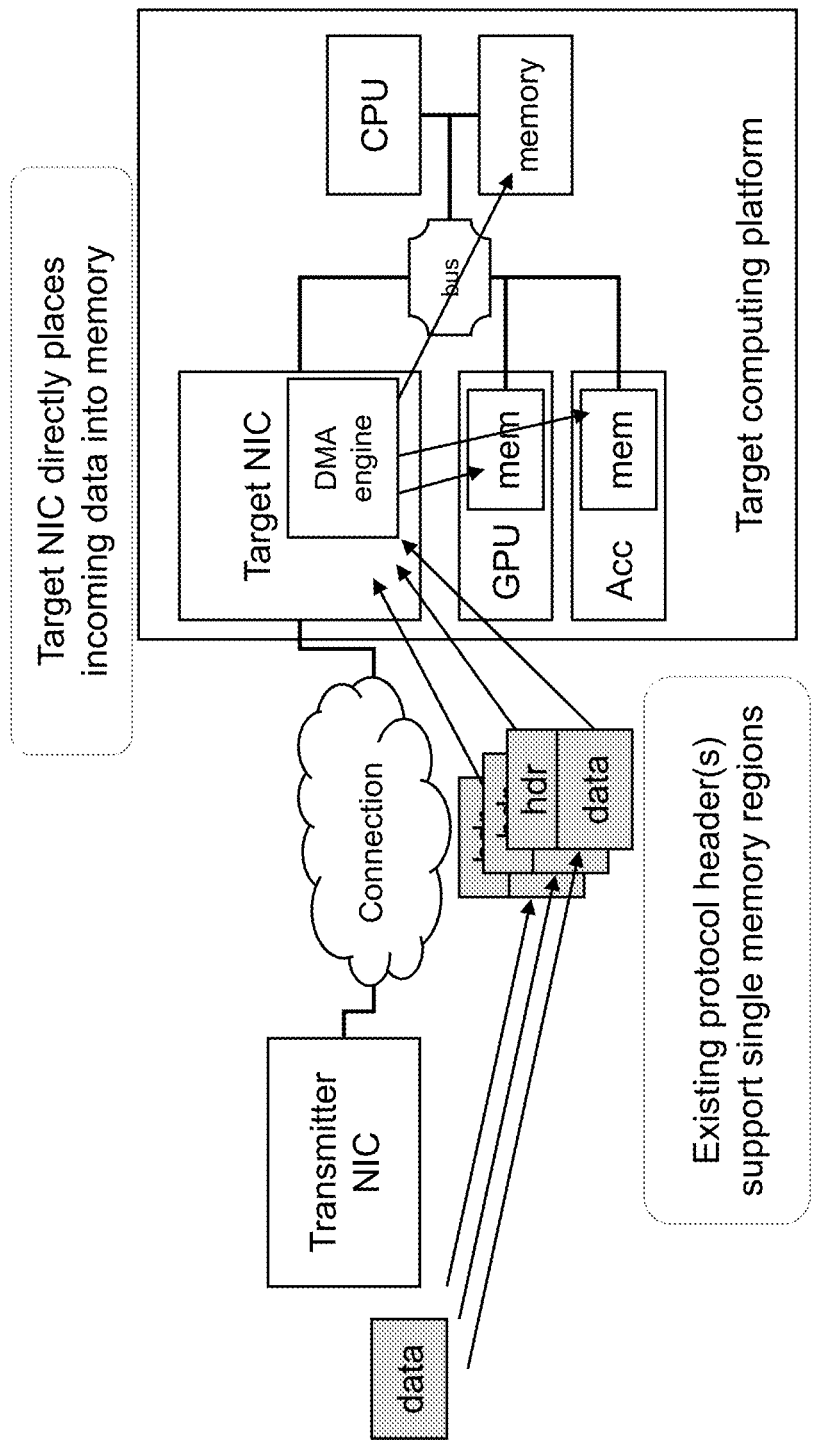
FIG. 1 depicts an example of transfer of data using a network to another memory domain.

FIG. 1 depicts an example of transfer of data using a network to another memory domain. For example, another memory domain can be non-shared memory region whereby a computing platform (not shown), that uses a transmitter NIC, does not have a mapping of address spaces in the destination memory and does not have access to the destination memory. If data is to be written to multiple destination memory domains, this solution would transmit data over the network with multiple remote direct memory access (RDMA) write operations taking place to each destination memory domain. In other words, the same data traverses the network multiple times, for each memory domain (e.g., graphics processing unit (GPU) or accelerator memory domains) at the target.

Although multicast can transfer packets to multiple destinations, it has several limitations that prevent its use as described here. Multicast traffic is unreliable, so RDMA operations are not allowed by current standards. Only send and receives are permitted, which prohibits the sender directing the data into the desired buffer. Additionally, multicast data is limited to a single packet or maximum transmission unit (MTU) (e.g., maximum packet size).

Figure 2:
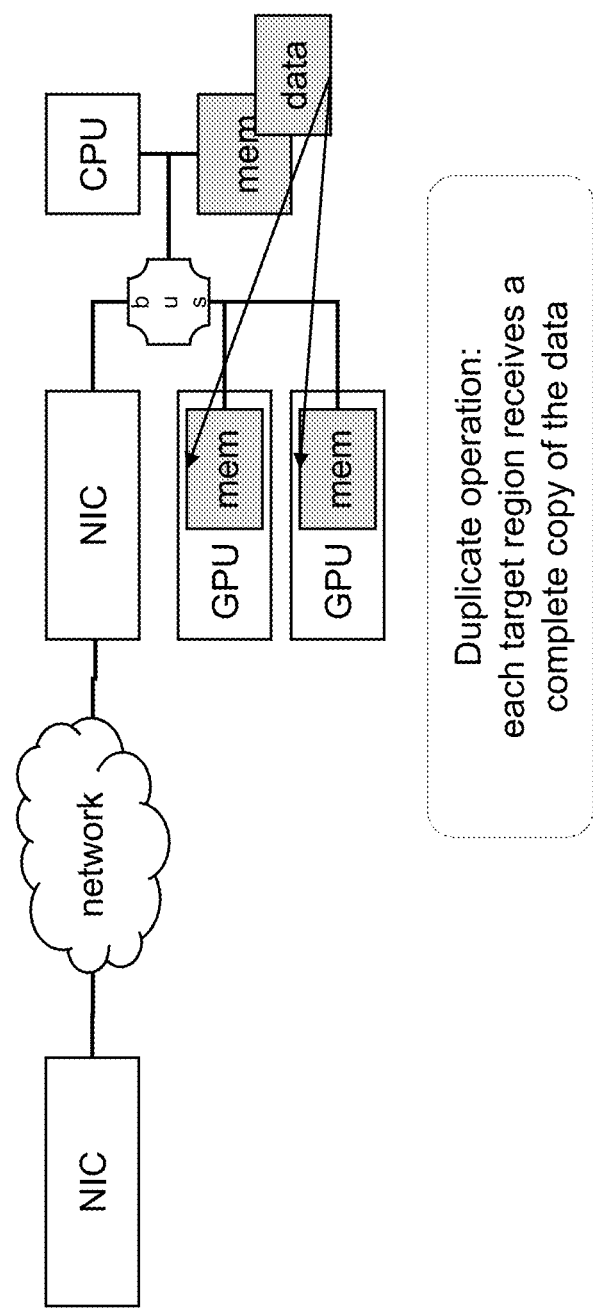
FIG. 2 depicts an example of transmitting data to a target and performing copying at the target.

FIG. 2 depicts an example of transmitting data to a target and performing copying at the target. In this example, a target processor (e.g., CPU) can receive a copy of data and perform copy a portion of the data to other destination memory regions. An application running at the target CPU would then be responsible for copying or distributing the data to other memory domains. However, this interrupts work being done by the host processor (CPU) in order to service the transfer, plus additional latency is incurred as a result of the data first arriving at the host memory system before being copied into the final memory domains.

Various embodiments provide a protocol and technologies that network interface controllers (NICs) with Remote Direct Memory Access (RDMA) offload capabilities or other remote direct write or read capabilities can use to direct a single data transfer to multiple memory domains, including a shared memory domain and one or more independent memory domains. Various embodiments can limit the number of times that data is transferred from a source to a target system to one copy, independent of how many copies are to be provided at one or more memory domains of the target system. For example, if the target system has multiple GPUs being used to accelerate data processing, a single network transfer could provide the same or different data to memory regions used by all GPUs, even if the GPUs share or do not share memory domains with the sender or among the GPUs. In some examples, the data is transferred directly into the GPU's memory without interrupting or involving the host CPUs. For "scatter" or "distribute" operations whereby different portions of a received packet are copied to different destination memory regions, it can also greatly reduce the number of network operations, allowing a single large transfer to a target in place of a multitude of smaller transfers (e.g., hundreds to thousands).

Figure 3:
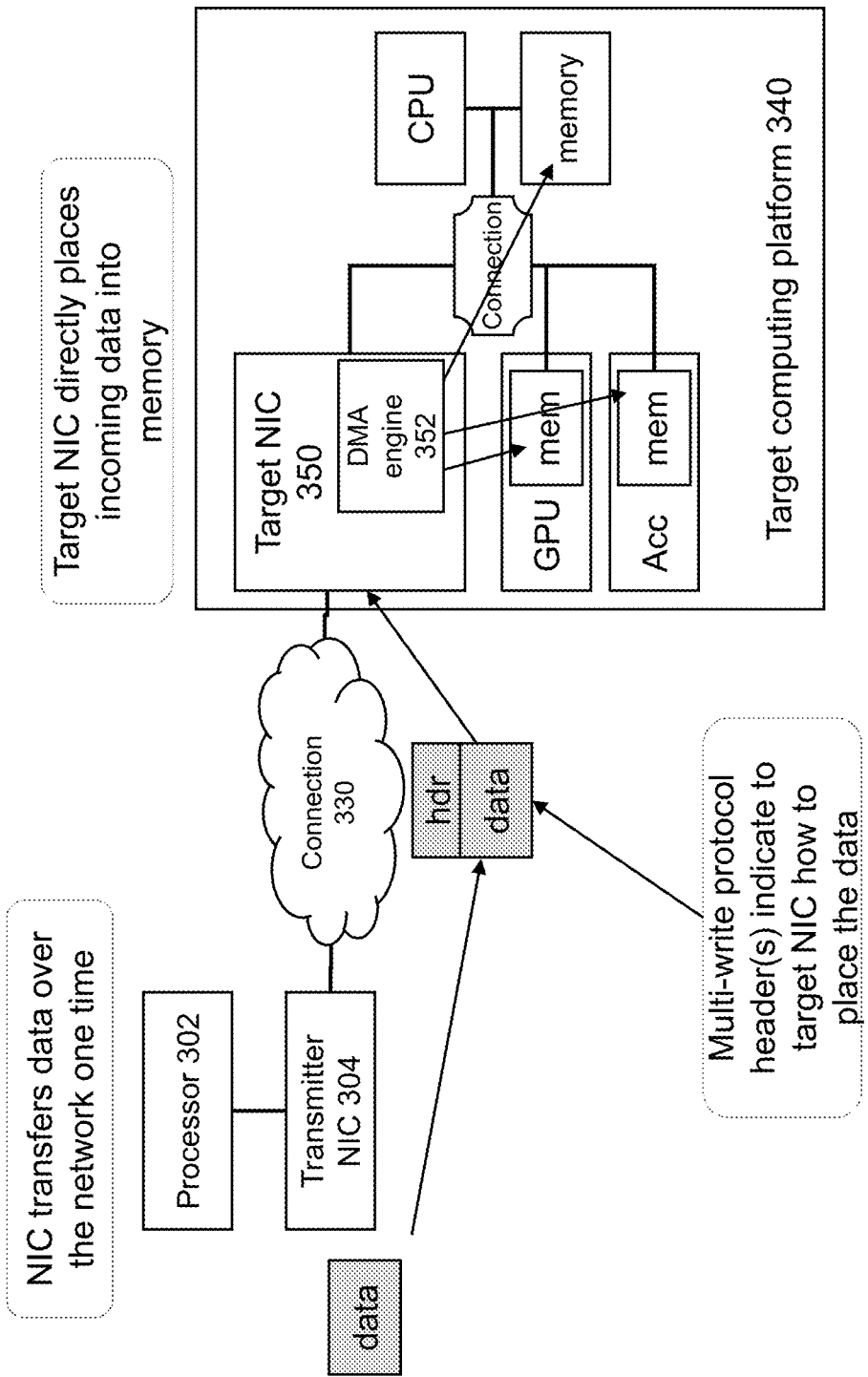
FIG. 3 depicts an example whereby data sent to a target NIC can include an indication of where to copy a portion of a packet among multiple memory devices or domains.

FIG. 3 depicts an example whereby data sent to a target NIC can include an indication of where to copy a portion of a packet among multiple memory regions, devices or domains. Target NIC 350 performs a copy of all or a portion of the data to one or more target locations. Various embodiments provide for data transfer over a connection 330 once, copying or distribution of data to multiple, isolated memory domains at the target system. An example of isolated memory domains refers to distinct memory management units (MMUs) and the memory that each MMU controls. For example, host memory could be one memory domain and a GPU would be a separate memory domain. An isolated memory domain can also be called heterogeneous memory. Physical memory, or RAM, is managed by an MMU that is responsible for allocating memory in response to application requests and freeing the memory when the application indicates that it is no longer needed. The MMU provides virtual to physical address translations. Additionally, this same technique could be applied for data being written to non-volatile memory regions or persistent memory, where data duplication may be desirable for high-availability reasons.

Processor 302 can execute applications and a virtualized execution environment. A virtualized execution environment can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux and Windows Server operating systems on the same underlying physical host. In some examples, data copied to multiple memory locations can be used by a single virtualized execution environment or by different virtualized execution environments.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. The isolated nature of containers provides several benefits. First, the software in a container will run the same in different environments. For example, a container that includes PHP and MySQL can run identically on both a Linux computer and a Windows machine. Second, containers provide added security since the software will not affect the host operating system. While an installed application may alter system settings and modify resources, such as the Windows registry, a container can only modify settings within the container.

In some examples, processor 302 can include any central processing unit (CPU), graphics processing unit (GPU), field programmable gate array (FPGA), or application specific integrated circuit (ASIC).

In response to requests from a processor 302 to transmit data or other content (e.g., meta data, neural network weights, commands, parameters, executable code, image data, video, memory addresses), transmitter NIC 310 can form packets or communications for transmission using connection 330. In some examples, transmitter NIC 310 can include one or more of: a network interface, interface to an interconnect, interface to be a bus, or interface to a fabric. Transmitter NIC 310 can format packets for transmission over connection 330. In some examples, processor 302 can configure transmitter NIC 310 to transmit packets with data, configurations or commands, where the packets include indicators of multiple memory destinations in which a target NIC 350 is to copy portions of a received packet. NIC 310 can include RDMA capabilities and can selectively format packets for remote direct copying into multiple memory destinations. In some examples, remote direct memory access semantics can use queue pairs (QP) associated with remote direct memory access (RDMA) as described at least in iWARP, InfiniBand, RDMA over converged Ethernet (RoCE) v2. Various examples of packet header formats are described with respect to FIG. 4.

Connection 330 can be one or more of: an interconnect, network, bus, or fabric. Connection 330 can be provide communications compatible or compliant with one or more of: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Target NIC 350 can receive packets from connection 330. Target NIC 350 decodes a packet header and the header includes commands or indicators that direct target NIC 350 as to where to place any portion of a received packet (e.g., header (hdr), data, payload, any payload contents) into destination memory locations using a direct memory access (DMA) engine 352. CPU of target computing platform 340 need not perform a copy of a received packet to a destination location. The destination locations can be in persistent memory (PMEM), disk, solid state memory, memory associated with and accessible to a GPU, memory associated with and accessible to an accelerator, a cache, and so forth. In some examples, destination memory devices are local to DMA engine 352 and the destination memory devices (mem or memory) and DMA engine 352 can be conductively coupled using a motherboard. DMA engine 352 can make a copy of any portion of a received packet to a destination memory using a bus, although an interconnect, fabric, network, or any connection type described with respect to connection 330 can be used. However, in other examples, DMA engine 352 can make a copy of contents of a received packet using a fabric or network to another destination memory device using RDMA, iWARP, RoCE, or another remote direct memory access operation.

For example, a packet can specify locations of portions of the payload or data portions of the packet in a destination memory device or devices in which to store one or more portions of the packet. For example, the packet can include portions 1, 2, and 3 and the packet header can specify to copy portion 1 to multiple memory addresses A and B, copy portion 2 to memory address C, and copy portion 3 to memory addresses D, E, and F. Accordingly any portion of a packet can be copied to one or more destinations in a single or multiple memory devices, whether the memory domains are isolated or shared.

In some examples, transmitter NIC 310, connection 330, target NIC 350, accelerators (Acc), GPUs and their memory can be located in the same data center or server. In some examples, the devices are distributed across a base station, edge server device, fog server device and data center.

For example, target computing platform 340 can provide processors that provide capabilities described herein. For example, processors can provide compression (DC) capability, cryptography services such as public key encryption (PKE), cipher (decryption or encryption), hash/authentication capabilities, or other capabilities or services. In some embodiments, in addition or alternatively, target computing platform 150 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Target computing platform 340 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Target computing platform 340 can include a memory pool or storage pool, or computational memory pool or storage pool or memory used by a processor (e.g., accelerator). A computational memory or storage pool can perform computation local to stored data and provide results of the computation to a requester or another device or process. For example, target computing platform 340 can provide near or in-memory computing.

Target computing platform 340 can include or access local or remote hardware or software that perform Network Function Virtualization (NFV), software-defined networking (SDN), virtualized network function (VNF), or Evolved Packet Core (EPC). Some example implementations of NFV are described in European Telecommunications Standards Institute (ETSI) specifications or Open Source NFV Management and Orchestration (MANO) from ETSI's Open Source Mano (OSM) group. VNF can include a service chain or sequence of virtualized tasks executed on generic configurable hardware such as firewalls, domain name system (DNS), caching or network address translation (NAT) and can run as virtual machines (VMs) or in virtual execution environments. VNFs can be linked together as a service chain. In some examples, EPC is a 3GPP-specified core architectures at least for Long Term Evolution (LTE) access.

Note that target computing platform 340 can use similar techniques to provide any results of computation to one or multiple memory domains or regions of the processor 302. In some examples, RDMA, iWARP, RoCE, or any remote direct copy operation can be used to provide results of computation to the initiator. The result of computation can be data, an inference, a processed image, an image overlay, a database, or any content or meta data.

Figure 4:
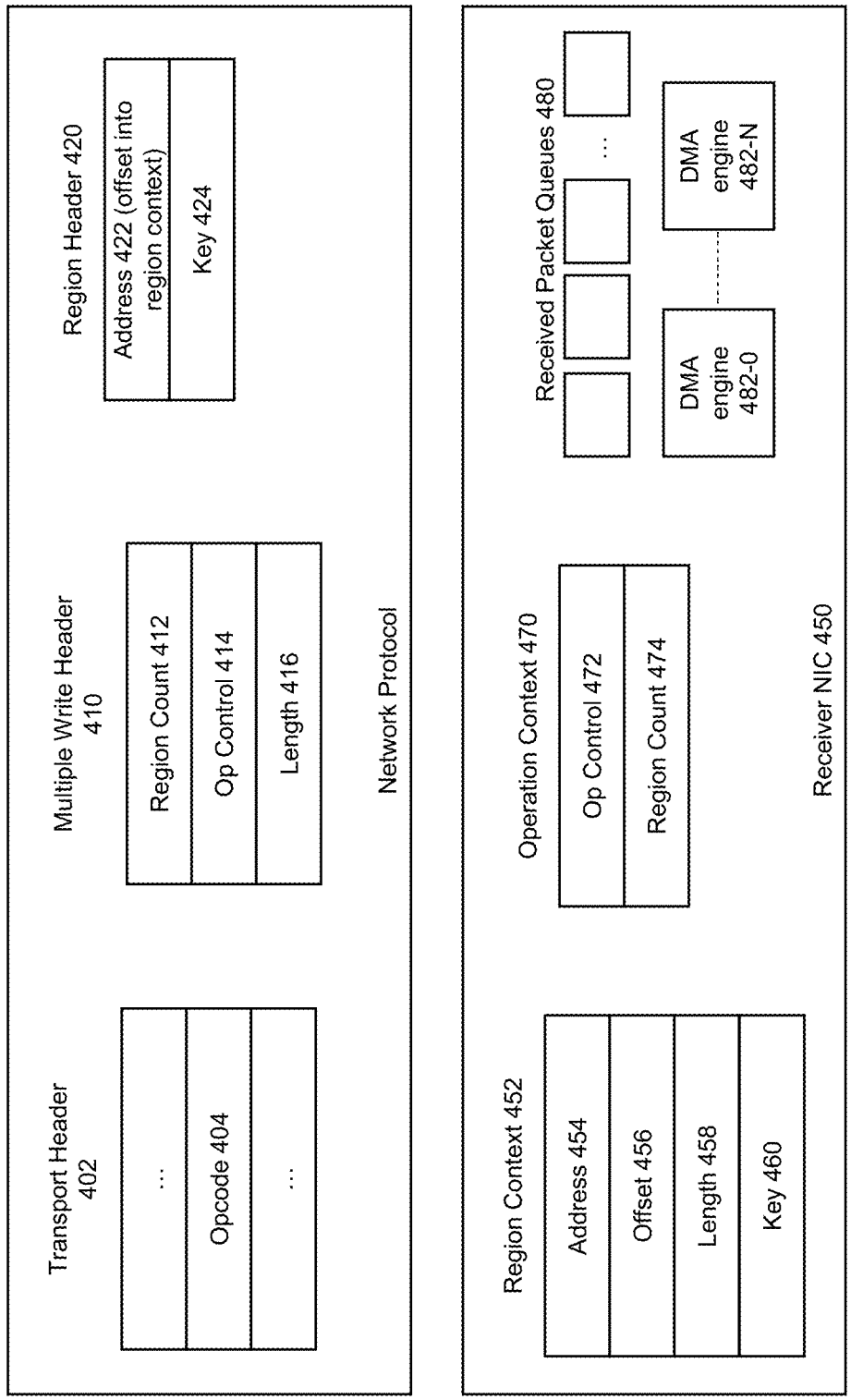
FIG. 4 depicts an example of a packet format of a transmitted and received packet.

FIG. 4 depicts an example of a packet format of a transmitted and received packet. In an RDMA format packet, an RDMA multiple write (MULTI-WRITE) opcode is defined as part of the base transport protocol header. When specified, Multiple Write Header 410 follows the base transport header. Multiple Write Header 410 can include the following fields: Region Count, Op Control, and Length.

| Example Field | Example description |
| --- | --- |
| Region Count 412 | The number of memory domains/regions that the MULTI-WRITE data will be written to or copied to. A number of copies to be made. This indicates the number of Region Headers that follow the Multiple Write Header. |
| Op Control 414 | An operational control code that controls how data is placed into memory domains/regions. This field can be used to modify the operation of the MULTI-WRITE transfer, with possible adjustments described below.<br>Duplicate - Data is copied to all indicated regions. This is the default operation defined previously.<br>Distribute - The data is divided evenly among the regions, with each region receiving 1/region_count of the data, in order. This allows the initiator to transfer the data as a single operation, with the target splitting the data among the available processing units.<br>Scatter - The data is divided among the regions, where each region receives X bytes of data, in a round robin fashion. The scatter option requires additional control data, such as the value of X, which is included as part of the Op Control data. This option allows the initiator to transfer a large table of data, with individual data columns or rows being written to a region. |
| Length 416 | Specifies the size of the incoming transfer such as a length of a whole transfer (entire pay load size). This field could be part of transport header. |

In some embodiments, there is one Region Header for a targeted memory domain. Accordingly, for X number of targeted memory domains, there are X number of Region Headers. The following describes example fields in a Region Header.

| Example Field | Example description |
| --- | --- |
| Address 422 | An offset into the memory region where the write should begin. The address is relative to the NIC, target process, and region's memory key. |
| Key 424 | A key used to identify the targeted memory region. Can be used to validate a write operation and/or the sender. |

The MULTI-WRITE command is handled by an RDMA protocol compatible NIC, with protocol processing offloaded onto the NIC from a processor. For example, RDMA is described at least with respect to RFC 5040. When a MULTI-WRITE message is received from a connection, the receiver NIC updates an Operation Context 470. Operation Context 470 records the opcode associated with the transfer, and for a MULTI-WRITE operation records the Region Count carried in the Multiple Write Header.

For a region being accessed, the NIC allocates a Region Context 452. The Region Headers are used to initialize Region Context 452, saving at least the Address 454 and Key 460 fields. Region Context Offset 456 field is initialized to 0, and Length 458 is initialized according to field Length 416. Note that a Length and Offset fields could be added to the Operation Context 470 in place of storing them per Region Context 452.

Receiver NIC 450 can store the information from a received packet. Region Context 452 from a received packet can be allocated for one Region Context 452 per count. The following provides an example of information stored in a Region Context 452.

| Example Field | Example description |
| --- | --- |
| Address 454 | Valid range of writeable region (bound). Can inhibit writes if attempted write is not in the writable region. |

-continued

| Example Field | Example description |
| --- | --- |
| Offset 456 | A copy of Address 422 from Region Header 420 (if validated and within valid range) indicates where next write will go. |
| Length 458 | Total size of memory available to receive. Can be used to check that incoming write does not exceed writable region. |
| Key 460 | A copy of Key 424 from Region Header 420. |

The following provides an example of information stored in Operation Context 470. Example Field Example description

| Example Field | Example description |
| --- | --- |
| Op Control 472 | Copied from Op Control 414 from Multiple Write Header 410. |
| Region Count 474 | Copied from Region Count 412 from Multiple Write Header 410. |

Various embodiments include an extension to devices capable of supporting Remote Direct Memory Access (RDMA), including InfiniBand, iWARP, and RoCE compatible NICs. Such devices support writing data over the network and placing data (or other content) directly into a target's memory buffers, known as an RDMA write operation. For example, an RDMA queue-pair can be used to identify a send queue and two or more receive queues.

A MULTI-WRITE packet is placed into a queue among Received Packet Queue 480 after it arrives from the connection. The application data (e.g., payload or portion of payload) from a packet is written into an identified memory region. The following pseudo-code shows an example operation for processing a packet identified as a MULTI-WRITE packet.

```
Opcode = MULTI-WRITE
region_count = multiple_write_header.region_count
/* Allocate and initialize the region contexts */
for i = 1 to region_count {
    region[i].address = region_header[i].address
    region[i].key = region_header[i].key
    region[i].offset = 0
    region [i].length = multiple_write_header.length
}
/* Process MULTI-WRITE packets */
for each packet {
    for i = 1 to region_count {
        verify write permission to: region[i].address to
            region[i].address + packet size
        write packet to region[i].address + region[i].offset
        region[i].offset += packet size
    }
}
```

Execution of the above pseudo-code copies the contents of a MULTI-WRITE packet (identified using an Opcode) starting at an offset (e.g., same offset) into each identified memory region at the target computing platform. Key 424 carried in Region Header 420 is used, along with the corresponding address, offset, and length, to verify that the MULTI-WRITE operation has permission to access the targeted region. For example, key 424 can be decrypted and if the resulting value is a permitted value or expected value, permission is granted to perform a multi-write operation. Configuration of permission to access the targeted region can be based on negotiation of access rights between a transmitter NIC and a receiver NIC and what particular areas of memory and address ranges. In some examples, NIC 450 performs address translation to convert address 454 to a physical address in a media.

Access rights to a region of memory can be selected by an application executing at the target. Peer applications can exchange memory keys in order to allow a remote peer to transfer directly to/from memory. The application assigns valid permissions when identifying a memory region and the memory region and allowed permissions are associated with an assigned memory protection key.

Figure 5A:
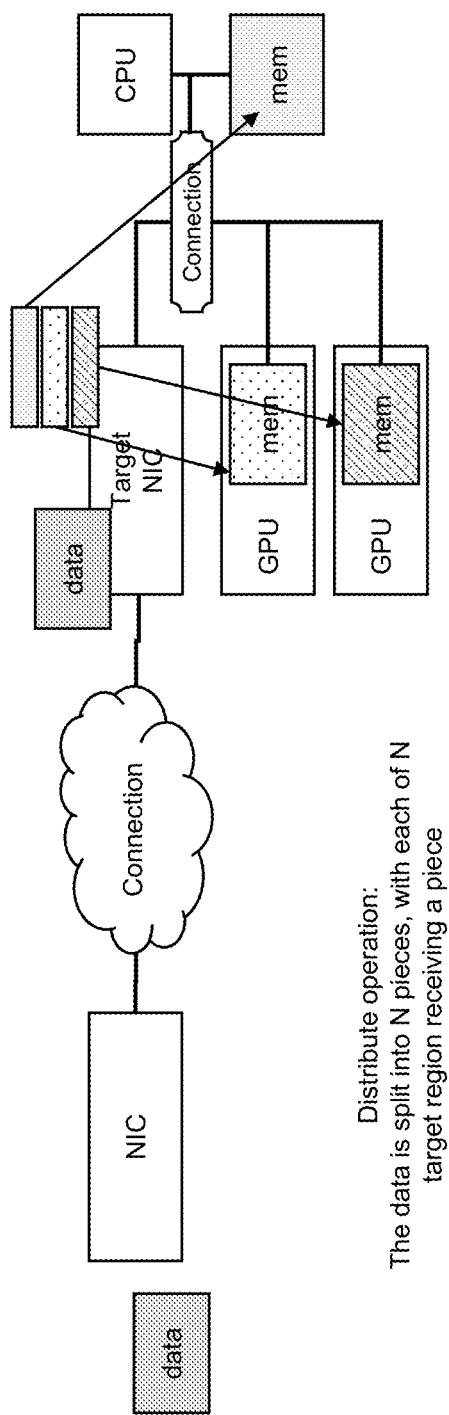
FIG. 5A depicts an example of splitting received data into N pieces.

FIG. 5A depicts an example of splitting or distributing received data into N pieces. A received payload provided for a MULTI-WRITE operation can be split received into N pieces. In this example, N=3. Accordingly, a memory of each accelerator or GPU receives ⅓ of the payload of a MULTI-WRITE packet. For example, a transmitter NIC can send data over a connection to a target NIC. The target NIC can copy pieces of the received data to destination memory locations.

Figure 5B:
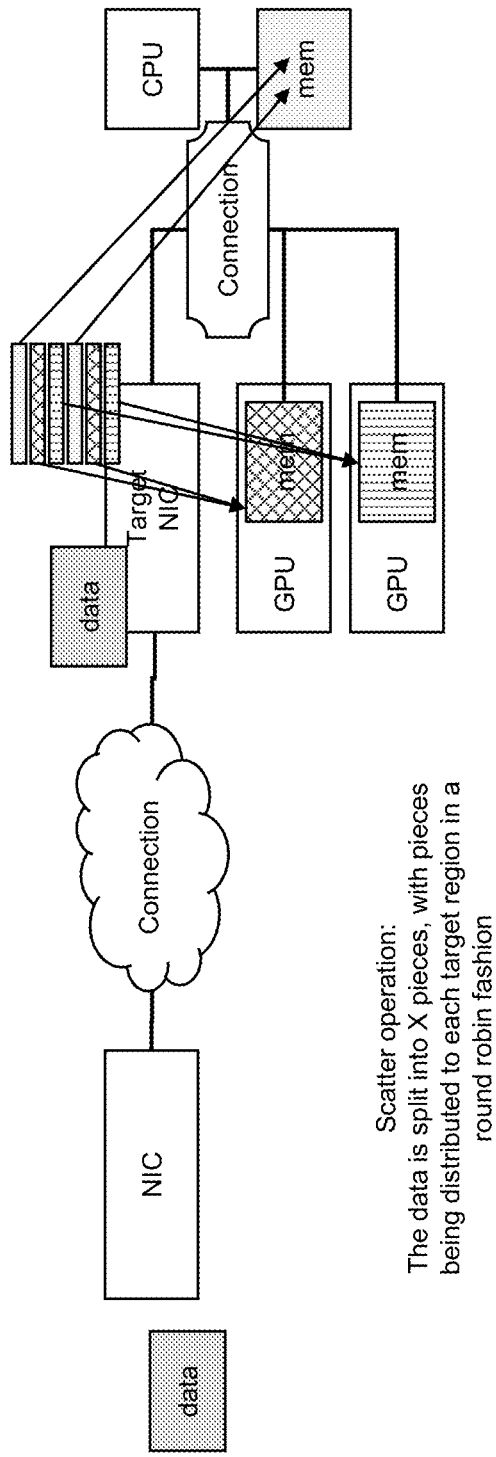
FIG. 5B depicts an example of striping received data into X pieces.

FIG. 5B depicts an example of splitting or scattering received data into X pieces. A received payload provided for a MULTI-WRITE operation can be split received into X pieces. Data includes an array of information. Each target memory receives a piece of an array of information in a round robin manner instead of a single contiguous portion of the packet payload being copied to a single memory. A round robin scheme can be used to distribute the X pieces among destination memories. In this example, there are three destination memories and X=6 so that a memory region receives two portions of the received data. For example, a transmitter NIC can send data over a connection to a target NIC. The target NIC can copy pieces of the received data to destination memory locations.

As an example, splitting, distributing, or scattering allow a large amount of data to be split among multiple destination GPUs or targets. After the transfer, each target device or software would perform some computation on their resulting piece of data. High-performance computing and artificial intelligence (AI) libraries frequently issue collective operations, where data results are collected and/or distributed among multiple peers. A multi-write packet could implement the data distribution (referred to as a scatter operation), so that the GPUs would be ready to perform the next computation operation.

Figure 6:
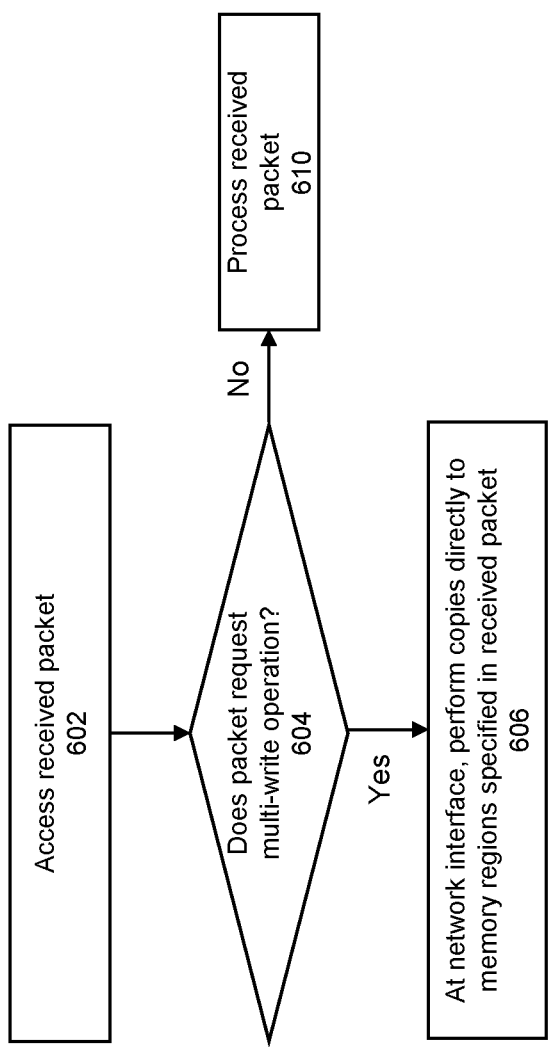
FIG. 6 depicts a process.

FIG. 6 depicts a process. At 602, a received packet is accessed. At 604, a determination is made as to whether the packet includes a designation to perform a multi-write operation. For example, a packet can include a designation to perform a multi-write if it includes an Op Code that designates the packet as requesting a multi-write operation. If the packet includes a designation to perform a multi-write, then 606 follows. If the packet does not include a designation to perform a multi-write, then 610 follows.

At 606, at a network interface, a direct memory access engine provides copies of a received packet directly to memory regions. For example, the received packet can include a designation of how many copies to make and the memory address to make copies to. In some examples, a same copy of a portion of the received packet can be copied into different memory regions starting at the same offset from a beginning of an addressable region of a memory region. A beginning addressable region for the memory regions can be different so that even though the same offset is used, the starting address of any write is different among the memory regions.

At 610, a packet that does not request multi-write can be processed. Processing the packet can include copying the packet to a destination queue allocated for the packet. A DMA operation can be used to copy the packet to a destination queue allocated for the packet.

Figure 7:
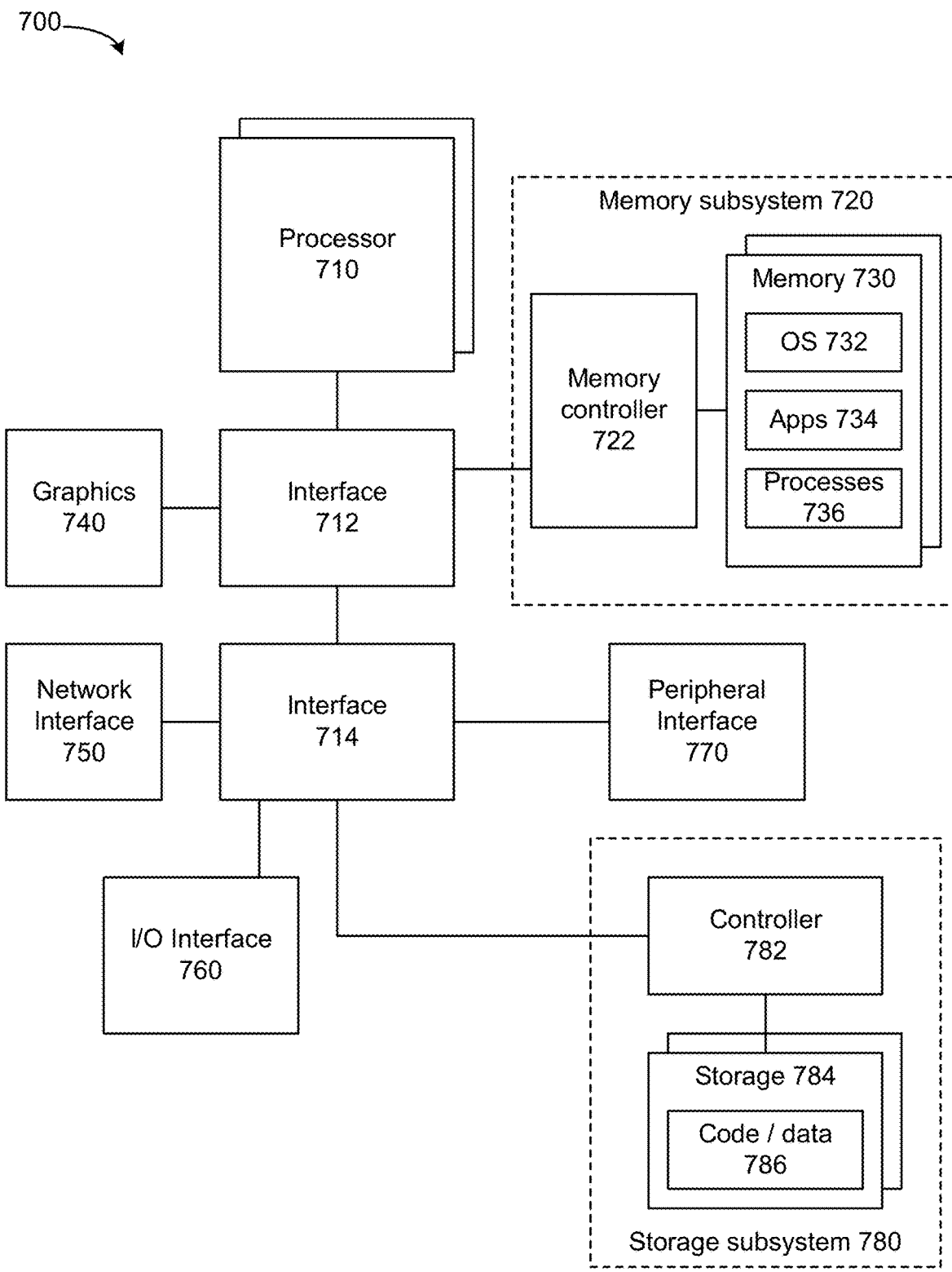
FIG. 7 depicts a system.

FIG. 7 depicts a system. The system can use embodiments described herein to provide a single write to multiple memory devices, regions, or different memory domains. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 742 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 can receive data from a remote device, which can include storing received data into memory. Various embodiments can be used in connection with network interface 750, processor 710, and memory subsystem 720.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007), DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

Figure 8:
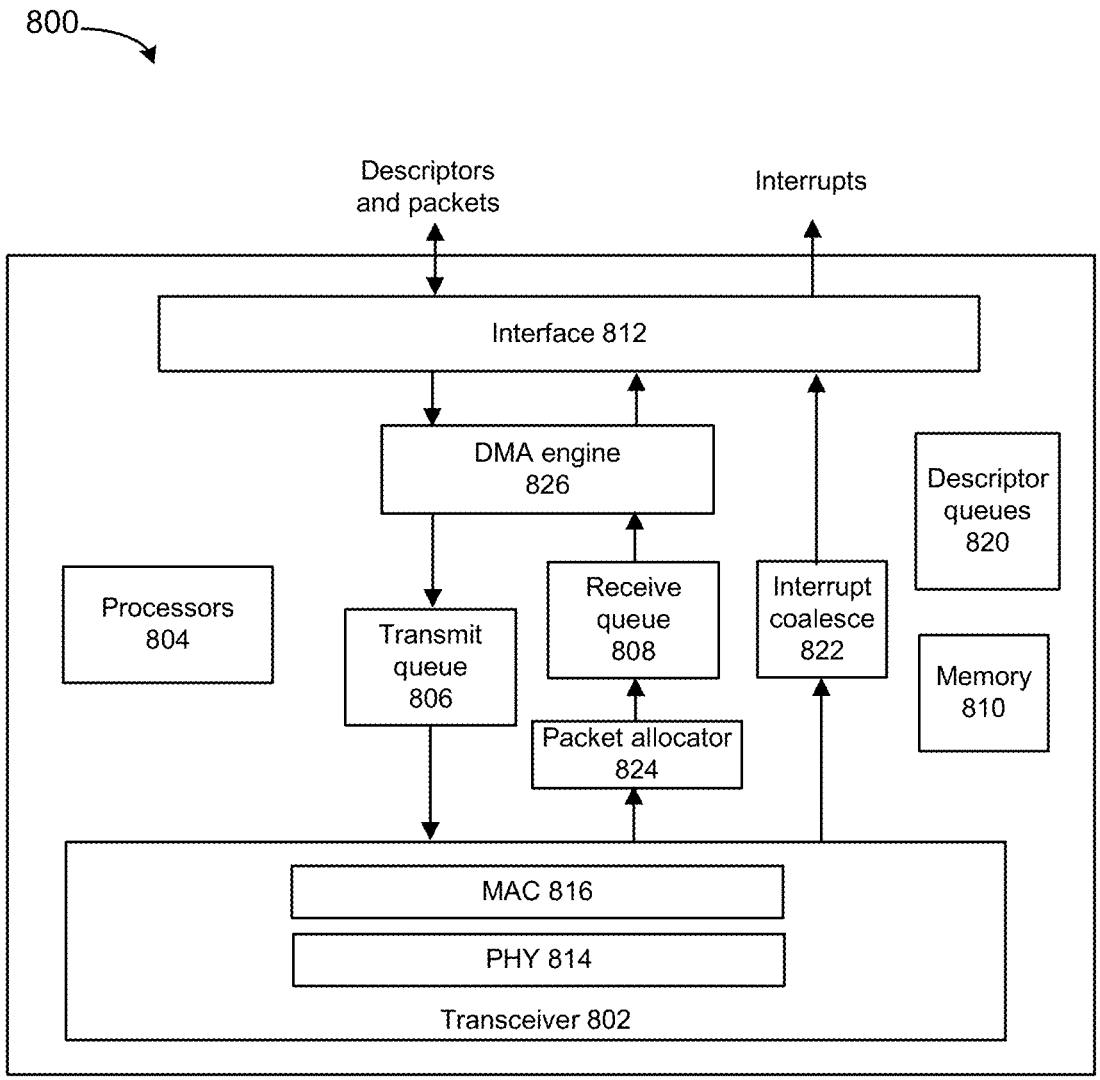
FIG. 8 depicts an example environment.

FIG. 8 depicts a network interface that can use embodiments or be used by embodiments. Various processors of network interface 800 can use techniques described herein to configure a packet to identify itself as invoking a multi-write operation and identifying where to write content of the packet to. Various processors of network interface 800 can process a packet to determine if it is a multi-write packet and perform validation if multi-write is permitted on the packet. Network interface 800 can include transceiver 802, processors 804, transmit queue 806, receive queue 808, memory 810, and bus interface 812, and DMA engine 826. Transceiver 802 can be capable of receiving and transmitting packets in conformance with the applicable protocols such as Ethernet as described in IEEE 802.3, although other protocols may be used. Transceiver 802 can receive and transmit packets from and to a network via a network medium (not depicted). Transceiver 802 can include physical layer (PHY) circuitry 814 and media access control (MAC) circuitry 816. PHY circuitry 814 can include encoding and decoding circuitry (not shown) to encode and decode data packets according to applicable physical layer specifications or standards. MAC circuitry 816 can be configured to assemble data to be transmitted into packets, that include destination and source addresses along with network control information and error detection hash values. MAC circuitry 816 can be configured to process MAC headers of received packets by verifying data integrity, removing preambles and padding, and providing packet content for processing by higher layers.

Processors 804 can be any a combination of a: processor, core, graphics processing unit (GPU), field programmable gate array (FPGA), application specific integrated circuit (ASIC), or other programmable hardware device that allow programming of network interface 800. For example, processors 804 can provide for allocation or deallocation of intermediate queues. For example, a "smart network interface" can provide packet processing capabilities in the network interface using processors 804.

Packet allocator 824 can provide distribution of received packets for processing by multiple CPUs or cores using timeslot allocation described herein or RSS. When packet allocator 824 uses RSS, packet allocator 824 can calculate a hash or make another determination based on contents of a received packet to determine which CPU or core is to process a packet.

Interrupt coalesce 822 can perform interrupt moderation whereby network interface interrupt coalesce 822 waits for multiple packets to arrive, or for a time-out to expire, before generating an interrupt to host system to process received packet(s). Receive Segment Coalescing (RSC) can be performed by network interface 800 whereby portions of incoming packets are combined into segments of a packet. Network interface 800 provides this coalesced packet to an application.

Direct memory access (DMA) engine 826 can copy a packet header, packet payload, and/or descriptor directly from host memory to the network interface or vice versa, instead of copying the packet to an intermediate buffer at the host and then using another copy operation from the intermediate buffer to the destination buffer. For multi-write packets that are permitted to be copied to multiple destinations, DMA engine 826 can perform the copy operations.

Memory 810 can be any type of volatile or non-volatile memory device and can store any queue or instructions used to program network interface 800. Transmit queue 806 can include data or references to data for transmission by network interface. Receive queue 808 can include data or references to data that was received by network interface from a network. Descriptor queues 820 can include descriptors that reference data or packets in transmit queue 806 or receive queue 808. Bus interface 812 can provide an interface with host device (not depicted). For example, bus interface 812 can be compatible with peripheral connect Peripheral Component Interconnect (PCI), PCI Express, PCI-x, Serial ATA (SATA), and/or Universal Serial Bus (USB) compatible interface (although other connection standards may be used).

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications).

Figure 9:
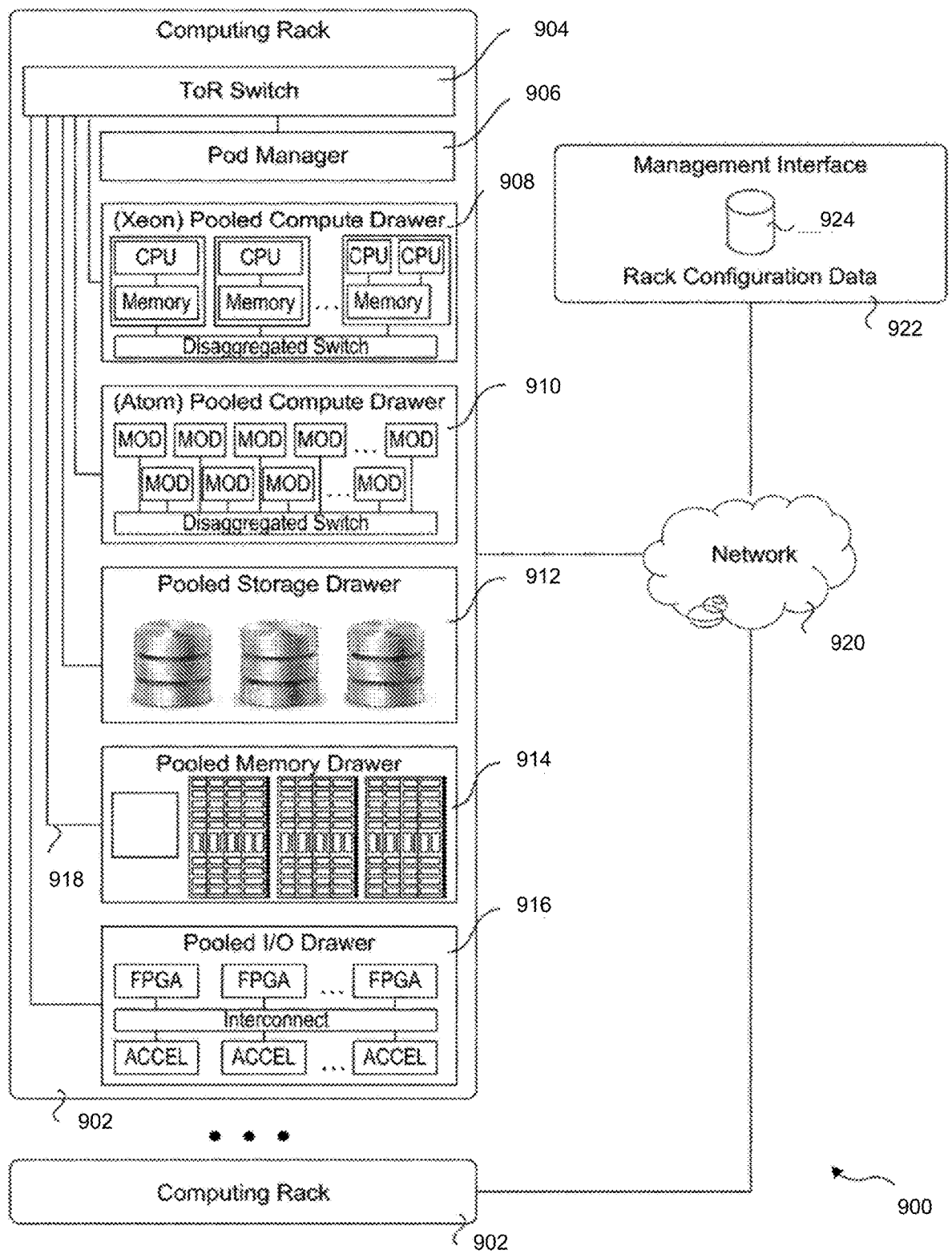
FIG. 9 depicts a network interface that can use embodiments or be used by embodiments.

FIG. 9 depicts an environment 900 includes multiple computing racks 902, each including a Top of Rack (ToR) switch 904, a pod manager 906, and a plurality of pooled system drawers. Various embodiments can be used in a switch. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 908, and Intel® ATOM™ pooled compute drawer 910, a pooled storage drawer 912, a pooled memory drawer 914, and a pooled I/O drawer 916. Each of the pooled system drawers is connected to ToR switch 904 via a high-speed link 918, such as a 40 Gigabit/second (Gb/s) or 100 Gb/s Ethernet link or a 100+Gb/s Silicon Photonics (SiPh) optical link. In one embodiment high-speed link 818 comprises an 800 Gb/s SiPh optical link.

Multiple of the computing racks 902 may be interconnected via their ToR switches 904 (e.g., to a pod-level switch or data center switch), as illustrated by connections to a network 920. In some embodiments, groups of computing racks 902 are managed as separate pods via pod manager(s) 906. In one embodiment, a single pod manager is used to manage all of the racks in the pod. Alternatively, distributed pod managers may be used for pod management operations.

Environment 900 further includes a management interface 922 that is used to manage various aspects of the environment. This includes managing rack configuration, with corresponding parameters stored as rack configuration data 924.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes an apparatus comprising: a memory and a network interface comprising at least one processor communicatively coupled to the memory, the at least one processor to: access a packet and based on the packet including a designation to copy a portion of the packet to at least two destinations in the memory: copy a first portion of the packet to a first destination based on the designation and copy the first portion of the packet to a second destination based on the designation.

Example 2 includes any example, wherein the at least one processor is to: determine if the packet includes a designation to copy a portion of the packet to at least two destinations in the memory.

Example 3 includes any example, wherein: the packet includes the first portion and a second portion and based on the packet including a designation to copy the first portion to an associated at least one destination and the second portion to an associated at least one destination, the network interface is to perform at least one copy of the first portion to the associated at least one destination and the network interface is to perform at least one copy of the second portion to the associated at least one destination.

Example 4 includes any example, wherein the first portion is different than the second portion.

Example 5 includes any example, wherein: the packet includes the first portion, a second portion and a third portion and based on the packet including a designation to copy the first portion to an associated at least one destination, the second portion to an associated at least one destination, and the third portion to an associated at least one destination, the network interface is to: perform at least one copy of the first portion to the associated at least one destination, perform at least one copy of the second portion to the associated at least one destination, and perform at least one copy of the third portion to the associated at least one destination.

Example 6 includes any example, wherein the designation comprises a portion of a header that indicates performance of a multi-write operation and at least one destination.

Example 7 includes any example, wherein the designation comprises a header that indicates one or more of: an op code to specify a multi-write operation, a number of memory regions that the portion will be written to, a size of incoming payload, or an offset into a memory region where a write is to begin.

Example 8 includes any example and including at least one direct memory access (DMA) engine to perform a copy of the first portion of the packet to the first destination and the second destination.

Example 9 includes any example, wherein the first destination and the second destination comprise memory addresses accessible to one or more of: an accelerator, graphics processing unit, or central processing unit.

Example 10 includes any example, and includes one or more of: a compute sled, a data center, server, rack, blade, or a host computer.

Example 11 includes a method that includes: receiving a single packet with an indication to copy a portion of the packet to a first destination and to copy a second portion of the packet to a second destination; performing, by a direct memory access, a copy of the portion to the first destination; and performing, by a direct memory access, a copy of the second portion to the second destination.

Example 12 includes any example, wherein a network interface performs the receiving and performing the copies.

Example 13 includes any example, wherein the portion immediately precedes the second portion in the single packet.

Example 14 includes any example, wherein the single packet includes an indication to copy a third portion of the packet to a third destination and to copy a fourth portion of the packet to a fourth destination and comprising: performing, by a direct memory access operation, a copy of the third portion to the third destination and performing, by a direct memory access operation, a copy of the fourth portion to the fourth destination.

Example 15 includes any example, wherein the indication comprises a portion of a header of the packet that indicates performance of a multi-write operation and at least one destination.

Example 16 includes any example, wherein the indication comprises a header that indicates one or more of: an op code to specify a multi-write operation, a number of memory regions that a portion will be written to, a size of incoming payload, or an offset into a memory region where the write is to begin.

Example 17 includes any example and including: processing data in the first and second destinations using one or more of: an accelerator, graphics processing unit, or central processing unit.

Example 18 includes a computer-readable medium comprising instructions stored thereon, that if executed, causes at least one processor to perform: request a packet to be formed with a header that includes an indication to copy content of the packet to multiple destinations and cause a single copy of the packet to be transmitted to a destination.

Example 19 includes any example, wherein the indication comprises a portion of a header of the packet that indicates performance of a multi-write operation and at least one destination.

Example 20 includes any example, wherein the indication comprises a header that indicates one or more of: an op code to specify a multi-write operation, a number of memory regions that content will be written to, a size of incoming payload, or an offset into a memory region where the write is to begin.

Example 21 includes any example, and includes instructions stored thereon, that if executed, cause at least one processor to perform: configure a network interface to establish and use a remote direct memory access (RDMA) to cause a copy of content of the packet to multiple destinations in memory.

What is claimed is:

1. An apparatus comprising:
   a network interface comprising direct memory access (DMA) circuitry and circuitry configured to:
   access a received packet, wherein the received packet comprises a header and a payload and
   based on the received packet including a designation to copy a portion of the received packet to at least two destinations, wherein the designation comprises command that is positioned in the header of the received packet:
   copy, by at least one DMA operation of the DMA circuitry, a first portion of the payload to a first destination of the at least two destinations based on the designation and
   copy, by at least one DMA operation of the DMA circuitry, the first portion of the payload to a second destination of the at least two destinations based on the designation.

2. The apparatus of claim 1, wherein the circuitry is configured to:
   determine if the received packet includes a designation to copy the portion of the received packet to at least two destinations in a memory.

3. The apparatus of claim 1, wherein:
   the packet payload includes the first portion and a second portion and
   based on the received packet including a designation to copy the first portion to an associated at least one destination and the second portion to an associated at least one destination, the DMA circuitry is to perform at least one copy of the first portion to the associated at least one destination and the circuitry is to perform at least one copy of the second portion to the associated at least one destination.

4. The apparatus of claim 3, wherein the first portion is different than the second portion.

5. The apparatus of claim 1, wherein:
   the packet payload includes the first portion, a second portion and a third portion and
   based on the received packet including a designation to copy the first portion to an associated at least one destination, the second portion to an associated at least one destination, and the third portion to an associated at least one destination, the DMA circuitry is to:
   perform at least one copy of the first portion to the associated at least one destination,
   perform at least one copy of the second portion to the associated at least one destination, and
   perform at least one copy of the third portion to the associated at least one destination.

6. The apparatus of claim 1, wherein the command comprises one or more of: an op code to specify a multi-write operation, a number of memory regions that the portion will be written to, a size of incoming payload, or an offset into a memory region where a write is to begin.

7. The apparatus of claim 1, wherein the first destination of the at least two destinations and the second destination of the at least two destinations comprise memory addresses accessible by one or more of: an accelerator, graphics processing unit, or central processing unit.

8. The apparatus of claim 1 further comprising one or more of: a compute platform, a data center, server, rack, blade, or a host computer and the network interface is coupled to the one or more of: a compute platform, a data center, server, rack, blade, or a host computer and wherein the compute platform, a data center, server, rack, blade, or a host computer is to process the first portion.

9. The apparatus of claim 1, wherein
remote direct memory access (RDMA) queue pairs are associated with communications including the received packet,
the queue pairs include at least one send queue and at least one receive queue, and
the at least one receive queue is to store the received packet.

10. The apparatus of claim 1, wherein the first destination of the at least two destinations is associated with a first memory device and wherein the second destination of the at least two destinations is associated with a second memory device.

11. The apparatus of claim 1, wherein the network interface is to perform remote direct memory access (RDMA) offload.

12. The apparatus of claim 1, wherein the received packet comprises a header field associated with a multi-write remote direct memory access (RDMA).

13. The apparatus of claim 1, wherein the command is solely within the header of the received packet.

14. The apparatus of claim 1, wherein the header is based on an Ethernet standard.

15. A method comprising:
receiving a packet that comprises an indication that comprises a command to a receiver network interface to copy a portion of the packet to a first destination and to copy a second portion of the packet to a second destination, wherein the packet includes a header portion and a payload portion and wherein the packet includes at least one header field in the header portion that includes the indication;
performing, by a direct memory access (DMA) operation, a copy of the portion to the first destination; and
performing, by a DMA operation, a copy of the second portion to the second destination.

16. The method of claim 15, wherein the receiver network interface performs the receiving and performing the copies.

17. The method of claim 15, wherein the portion immediately precedes the second portion in the packet.

18. The method of claim 15, wherein the packet includes an indication to copy a third portion of the packet to a third destination and to copy a fourth portion of the packet to a fourth destination and comprising:
performing, by a DMA operation, a copy of the third portion to the third destination and
performing, by a DMA operation, a copy of the fourth portion to the fourth destination.

19. The method of claim 15, wherein the command comprises one or more of: an op code to specify a multi-write operation, a number of memory regions that a portion will be written to, a size of incoming payload, or an offset into a memory region where a write is to begin.

20. The method of claim 15, comprising processing data from the packet in the first and second destinations using one or more of: an accelerator, graphics processing unit, or central processing unit.

21. The method of claim 15, wherein the header portion is based on an Ethernet standard.

22. At least one non-transitory computer-readable medium comprising instructions stored thereon, that when executed, causes at least one processor to:
configure a network interface device to establish and use a remote direct memory access (RDMA) to cause a copy of content of a packet to multiple destinations in memory;
provide a request to the network interface device to initiate forming the packet with a header that includes an indication with a command to a receiver network interface device to copy a first portion of a payload of the packet to a first destination in at least one memory device and to copy the first portion of the packet to a second destination in at least one memory device, wherein the packet includes the header and the payload, wherein the header comprises the command; and
cause the network interface device to transmit a single copy of the packet to the receiver network interface device, wherein the receiver network interface device is communicatively coupled to the at least one memory device.

23. The non-transitory computer-readable medium of claim 22, wherein the indication comprises one or more of: an op code to specify a multi-write operation, a number of memory regions that content will be written to, a size of incoming payload, or an offset into a memory region where a write is to begin.

* * * * *